(12) United States Patent
Park et al.

(10) Patent No.: US 7,561,347 B2
(45) Date of Patent: Jul. 14, 2009

(54) SUBMINIATURE OPTICAL SYSTEM

(75) Inventors: Il Yong Park, Seoul (KR); Yong Joo Jo, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 70 days.

(21) Appl. No.: 11/878,423

(22) Filed: Jul. 24, 2007

(65) Prior Publication Data

US 2008/0024882 A1  Jan. 31, 2008

(30) Foreign Application Priority Data

Jul. 25, 2006  (KR) ...................... 10-2006-0069788

(51) Int. Cl.
*G02B 9/34*  (2006.01)
(52) U.S. Cl. ........................ 359/773; 359/771; 359/772
(58) Field of Classification Search ................. 359/716, 359/771, 772, 773

See application file for complete search history.

(56) References Cited

U.S. PATENT DOCUMENTS 6,950,246 B2  9/2005  Amanai 7,466,497 B2 *  12/2008  Park et al. .................... 359/715
7,492,532 B2 *  2/2009  Shin .......................... 359/773
2009/0009889 A1 *  1/2009  Teraoka et al. .............. 359/773

FOREIGN PATENT DOCUMENTS

| EP | 1 531 353 A1 | 5/2005 |
| JP | 2004-102234 | 4/2004 |
| KR | 10-0428242 | 4/2004 |

* cited by examiner

*Primary Examiner*—David N Spector

(57) ABSTRACT

A subminiature optical system including: a first lens that is a biconvex lens with a positive refractive power; a second lens with a negative refractive power, the second lens formed in a meniscus shape convex toward an object side; a third lens with a positive refractive power, the third lens formed in a meniscus shape convex toward an image side; and a fourth lens with a negative refractive power, wherein a size in a direction of an optical axis satisfies Condition 1, and the refractive power of the first lens satisfies Condition 2, $1.2 < TL/f < 1.3$ ... Condition 1, $0.6 < f1/f1 < 0.8$ ... Condition 2 where TL indicates a length from an aperture stop to an image-side surface, f indicates an effective focal length of the overall optical system, and f1 indicates a focal length of the first lens.

15 Claims, 15 Drawing Sheets

SUBMINIATURE OPTICAL SYSTEM

CROSS-REFERENCE TO RELATED APPLICATIONS

This application claims the priority of Korean Patent Application No. 2006-0069788 filed on Jul. 25, 2006, in the Korean Intellectual Property Office, the disclosure of which is incorporated herein by reference.

BACKGROUND OF THE INVENTION

1. Field of the Invention

The present invention relates to an imaging optical system, and more particularly, to a subminiature image optical system mounted on a portable device such as a mobile communication terminal and a personal digital assistant or used for a monitoring camera and a digital camera.

2. Description of the Related Art

In general, mobile communication terminals had only functions of basic communication at their incipient stage. However, with increased use, the mobile communication terminals are required to have diversified functions ranging from photographing to image transmission and video communication, continuously evolving in their functions and services. Recently, a new expanded concept of mobile communication terminal by integrating digital camera technology with mobile phone technology, i.e., so called camera phones or camera mobile phones are significantly attracting attention.

In particular, the imaging optical system mounted on the camera phone is not only required to be miniaturized, light-weight and low cost, but also have high resolution since the pixel size of an image sensor formed of a charge-coupled device (CCD) or a complementary metal oxide semiconductor (CMOS) used in the imaging optical system is decreasing.

Also, a wide viewing angle is required with respect to the imaging optical system using the image sensor In order to satisfy miniaturization and low cost, the imaging optical system mounted on a small device such as a mobile phone needs to have a small number of lenses as possible, but this restricts a degree of freedom in designing and undermines the optical capabilities.

Therefore, there is required a subminiature imaging optical system capable of being easily miniaturized while having high resolution and a wide viewing angle.

SUMMARY OF THE INVENTION

An aspect of the present invention provides a subminiature optical system suitable for a subminiature optical device such as a camera for a mobile phone, the optical system using an image sensor such as a charge-coupled device (CCD) or a complementary metal oxide semiconductor (CMOS).

An aspect of the present invention also provides a subminiature optical system with an F-number of 3.0, a viewing angle of 62 degrees, high-resolution, and all kinds of improved aberrations.

An aspect of the present invention also provides a subminiature optical system capable of reducing a weight thereof, being mass-produced, and reducing manufacturing costs thereof by using a plurality of plastic lenses.

An aspect of the present invention also provides a subminiature optical system capable of obtaining high-resolution and having excellent optical characteristics by using aspherical lens.

According to an aspect of the present invention, there is provided a subminiature optical system including: a first lens that is a biconvex lens with a positive refractive power; a second lens with a negative refractive power, the second lens formed in a meniscus shape convex toward an object side; a third lens with a positive refractive power, the third lens formed in a meniscus shape convex toward an image side; and a fourth lens with a negative refractive power, wherein a size in a direction of an optical axis satisfies Condition 1, and the refractive power of the first lens satisfies Condition 2, $1.2<TL/f<1.3$ ... Condition 1, $0.6<f1/f<0.8$ ... Condition 2, where TL indicates a length from an aperture stop to an image-side surface, f indicates an effective focal length of the overall optical system, and f1 indicates a focal length of the first lens.

The refractive power of the second lens may satisfy Condition 3, the shape of the second lens may satisfy Condition 4, the refractive power of the third lens may satisfy Condition 6, and Abbe numbers of the first lens and the second lens may satisfy Condition 7, $0.8<|f2/f|<1.4$ ... Condition 3, $0.35<R4/f<2.0$ ... Condition 4, $0.8<f3/f<1.6$ ... Condition 5, $0.8<|f4/f|<4.0$ ... Condition 6, $25<|V2-V1|$ ... Condition 7 where f2 indicates a focal length of the second lens (f2<0), R4 indicates a curvature radius of an object-side surface of the second lens, f3 indicates a focal length of the third lens, f4 indicates a focal length of the fourth lens, V1 indicates the Abbe number of the first lens, and V2 indicates the Abbe number of the second lens.

The aperture stop may be provided between the first lens and the second lens.

According to another aspect of the present invention, there is provided a subminiature optical system including: a first lens that is a biconvex lens with a positive refractive power; a second lens with a negative refractive power, the second lens formed in a meniscus shape convex toward an object side; a third lens with a positive refractive power, the third lens formed in a meniscus shape convex toward an image side; and a fourth lens with a negative refractive power, wherein the refractive power of the second lens satisfies Condition 3, and the shape of the second lens satisfies Condition 4, $0.8<|f2/f|<1.4$ ... Condition 3, and $0.35<R4/f<2.0$ ... Condition 4 where f2 indicates a focal length of the second lens (f2<0), and R4 indicates a curvature radius of an object-side surface of the second lens.

A size in a direction of an optical axis may satisfy Condition 1, and the refractive power of the first lens satisfies Condition 2, the refractive power of the third lens may satisfy Condition 5, and the refractive power of the fourth lens may satisfy Condition 6, $1.2<TL/f<1.3$ ... Condition 1, $0.6<f1/f<0.8$ ... Condition 2, $0.8<f3/f<1.6$ ... Condition 5, $0.8<|f4/f|<4.0$ ... Condition 6, where TL indicates a length from an aperture stop to an image side, f indicates an effective focal length of the overall optical system, f1 indicates a focal length of the first lens, f3 indicates a focal length of the third lens, and f4 indicates a focal length of the fourth lens.

The aperture stop maybe provided between the first lens and the second lens.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
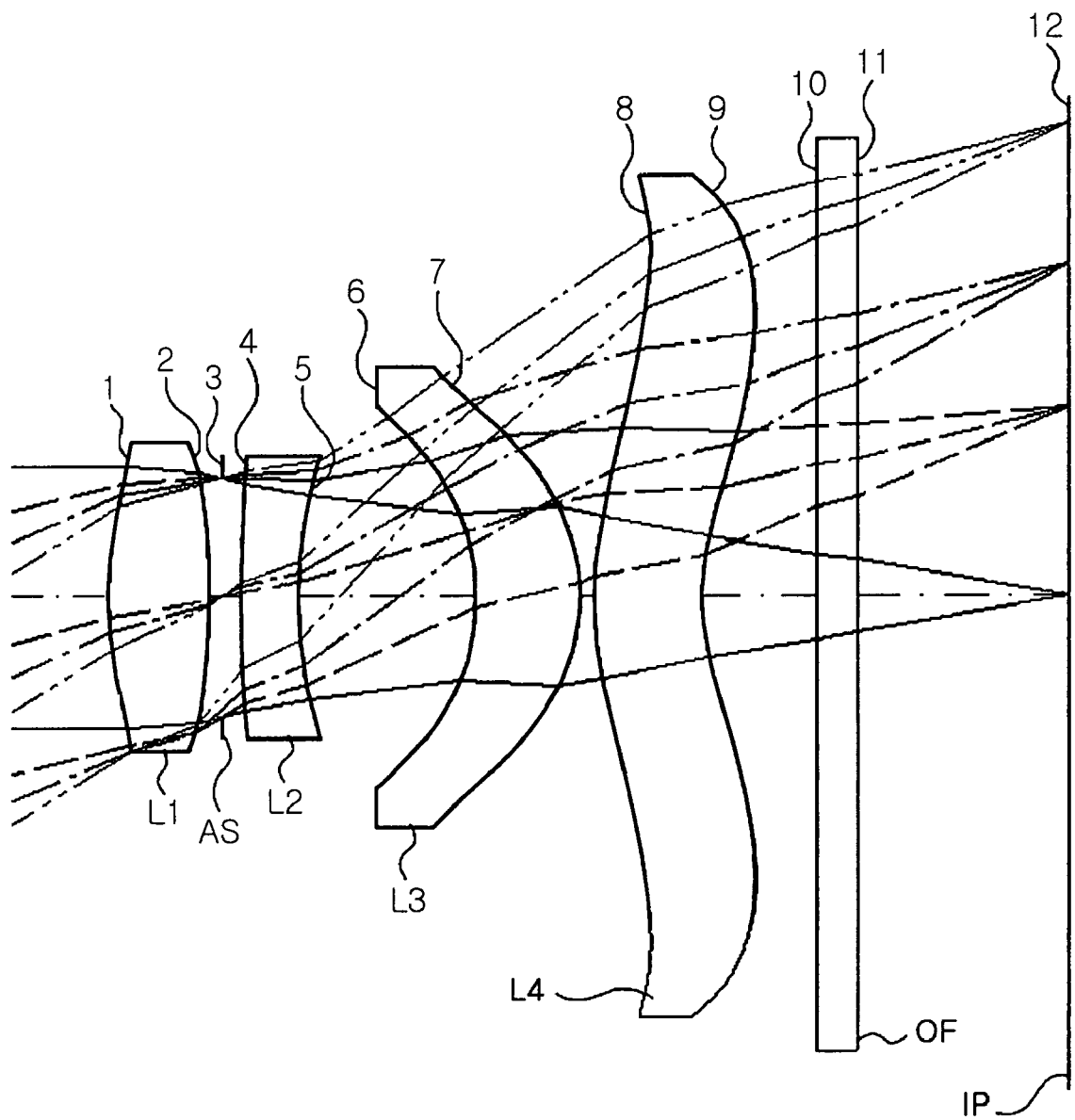
FIG. 1 is a configuration diagram illustrating lenses of a subminiature optical system according to a first embodiment of the present invention.

FIG. 1 is a configuration diagram illustrating lenses of a subminiature optical system according to an embodiment of the present invention. Hereinafter, in the drawings, the thicknesses, sizes, and shapes of lenses are exaggerated for clarity. Particularly, though the shapes of spherical surfaces and aspherical surfaces are shown in the drawings for examples, the present invention will not be limited to the shapes.

Referring to FIG. 1, the subminiature optical system has a first lens L1 that is a biconvex lens with a positive refractive power, a second lens L2 with a negative refractive power, the second lens L2 formed in a meniscus shape convex toward an object side, a third lens L3 with a positive refractive power, the third lens L3 formed in a meniscus shape convex toward an image side, a fourth lens L4 with a negative refractive power. An aperture stop AS is provided between the first lens L1 and the second lens L2.

In this case, the first lens L1, the third lens L3, and the fourth lens L4 may be formed of plastic material, and the second lens L2 may be formed of glass material.

On the other hand, an optical filter OF corresponding to an infrared filter and a cover glass is provided between the fourth lens L4 and an image-side surface IP.

Also, the image-side surface corresponds to an image sensor such as a charged coupled device (CCD) and a complementary metal-oxide semiconductor (CMOS).

In the subminiature according to an exemplary embodiment of the present invention, a chromatic aberration is reduced by increasing differences between the first lens L1 with a positive refractive power and the second lens L2 with a negative refractive power in Abbe numbers and refractive indexes, a size of the optical system is reduced by increasing the refractive powers of the first lens L1 and the second lens L2 relatively more than the refractive powers of the third lens L3 and the fourth lens L4, and aberration characteristics are excellent and high resolution, high definition, and a wide viewing angle are obtained by improving radiuses of curvatures of aspherical surfaces and refractive surfaces.

In addition, the aperture stop AS is disposed in the back of the first lens L1 whose refractive power is greatest, thereby easing tolerance sensitivity of lenses. A chief ray angle is reduced, thereby obtaining excellent distortion correction.

Particularly, resolution of lenses may be improved, a distortion aberration and spherical aberration may be reduced, and a compact optical system with excellent optical characteristics may be provided by using aspherical lenses.

Also, since some of lenses are formed of plastic materials, the aspherical lenses may be easily manufactured at a low price.

Under the configuration described above, operations and effects of Conditions 1 to 7 will be described.

$$1.2 < TL/f < 1.3 \qquad \text{Condition 1}$$

where TL indicates a length from an object-side surface 1 to an image-side surface 12 of the first lens L1, and f indicates an effective focal length of the overall optical system.

Condition 1 defines a size of the overall optical system in a direction of an optical axis, which is a condition on miniaturization and aberration correction. When TL/f is larger than an upper limit of Condition 1, though it is advantageous in an aspect of correcting various aberrations, a total length increases, which disagrees with the subminiature optical system. Also, when TL/f is smaller than a lower limit of Condition 1, the total length becomes too short to satisfy aberration correction and suitable telecentric characteristics and manufacturing tolerances increases to deteriorate performance of the optical system.

$$0.6 < f1/f < 0.8 \qquad \text{Condition 2}$$

where f1 indicates a focal length of the first lens L1, and f indicates the effective focal length of the overall optical system.

Condition 2 is a ratio of the focal length of the first lens L1 to an overall focal length, which defines the refractive power of the first lens L1.

When f1/f is smaller than a lower limit of Condition 2 and the refractive power of the first lens L1 increases, it is difficult to correct spherical aberration and to process and it largely depends on tolerances.

Also, when f1/f is larger than an upper limit and the refractive power of the first lens L1 decreases, miniaturization is difficult and a chromatic aberration increases.

$$0.8 < |f2/f| < 1.4 \qquad \text{Condition 3}$$

where f2 indicates a focal length of the second lens L2 (f2<0), and f indicates the effective focal length of the overall optical system.

Condition 3 is a ratio of the focal length of the second lens 2 to the overall focal length, which defines the refractive power of the second lens L2.

When |f2/f| is larger than an upper limit of Condition 3 and f2 decreases or |f2| increases, it is difficult to correct the chromatic aberration and to reduce a size due to an increase of the size in the direction of the optical axis. On the other hand, when |f2/f| is smaller than a lower limit of Condition 3 and f2 increases or |f2| decreases, it is difficult to correct the spherical aberration.

$$0.35 < R14/f < 2.0 \qquad \text{Condition 4}$$

where R4 indicates a radius of curvature of an object-side surface 4 of the second lens L2, and f indicates the effective focal length.

Condition 4 relates to a shape of the second lens L2.

When R4/f is larger than an upper limit of Condition 4, it is difficult to correct a coma aberration and astigmatism. When R4/f is smaller than a lower limit of Condition 4, it is difficult to manufacture the second lens L2 using glass material due to a decrease of a radius of curvature and mass production becomes obstructed by an increase of manufacturing tolerances.

$$0.8 < f3/f < 1.6 \qquad \text{Condition 5}$$

where f3 indicates a focal length of the third lens L3, and f indicates the effective focal length of the overall optical system.

Condition 5 is a ratio of the focal length of the third lens L3 to the overall focal length, which defines the refractive power of the third lens L3.

When f3/f is smaller than a lower limit of Condition 5 and f3 decreases, it is difficult to correct the distortion aberration. When f3/f is larger than an upper limit of Condition 5 and f3 increases, it is difficult to maintain the telecentric characteristics.

$$0.8 < |f4/f| < 4.0 \qquad \text{Condition 6}$$

where f4 indicates a focal length of the fourth lens L4 (f4<0), and f indicates the effective focal length.

Condition 6 is a ratio of the focal length of the fourth lens L4 to the overall focal length, which defines the refractive power of the fourth lens L4.

When |f4/f| is larger than an upper limit of Condition 6 and f4 decreases or |f4| increases, the refractive power decreases and it becomes difficult to satisfy requirements of miniaturization. On the other hand, when |f4/f| is smaller than a low limit of Condition 6 and f4 increases or |f4| decreases, it is difficult to correct the distortion aberration.

$$25 < |V2 - V1| \qquad \text{Condition 7}$$

where V1 indicates an Abbe number of the first lens L1, and V2 indicates an Abbe number of the second lens L2.

Condition 7 relates to correction of the chromatic aberration. When |V2-V1| is smaller than a lower limit of Condition 7 and a difference between the Abbe number of the first lens L1 and the Abbe number of the second lens L2 decreases, the chromatic aberration increases and it is difficult to apply to a high-pixel optical system.

Hereinafter, an exemplary embodiment of the present invention will be described through detailed numerical values.

As described above, optical systems according to a first through third embodiments include a first lens L1 that is a biconvex lens formed of plastic material with a positive refractive power, a second lens L2 with a negative refractive power, the second lens L2 formed of glass material in a meniscus shape convex toward an object side, a third lens L3 with a positive refractive power, the third lens L3 formed of plastic material in a meniscus shape convex toward an image side, a fourth lens L4 formed of plastic material with a negative refractive power. An aperture stop AS is provided between the first lens L1 and the second lens L2. Also, an optical filter OF corresponding to an infrared filter and a cover glass is provided between the fourth lens L4 and an image-side surface IP. Also, the image-side surface corresponds to an image sensor such as CCD and CMOS.

In each following embodiment, aspherical surfaces are obtained from well-known Equation 1, and "E and a number following the same" used in conic constant K and aspherical coefficients A, B, C, D, E, and F indicate powers of 10. For example, E+01 indicates $10^1$ and E-02 indicates $10^{-2}$.

$$Z = \frac{cY^2}{1 + \sqrt{1 - (1+K)c^2 Y^2}} + AY^4 + BY^6 + CY^8 + DY^{10} + EY^{12} + FY^{14} + \ldots \qquad \text{Equation 1}$$

where Z indicates a length from a definite point of a lens in a direction of an optical axis, Y indicates a length in a direction vertical to the optical axis, r indicates a radius of curvature at the definite point of the lens, K indicates a conic constant, and A, B, C, D, E, and F indicate aspherical coefficients.

Embodiment 1

Figure 2A:
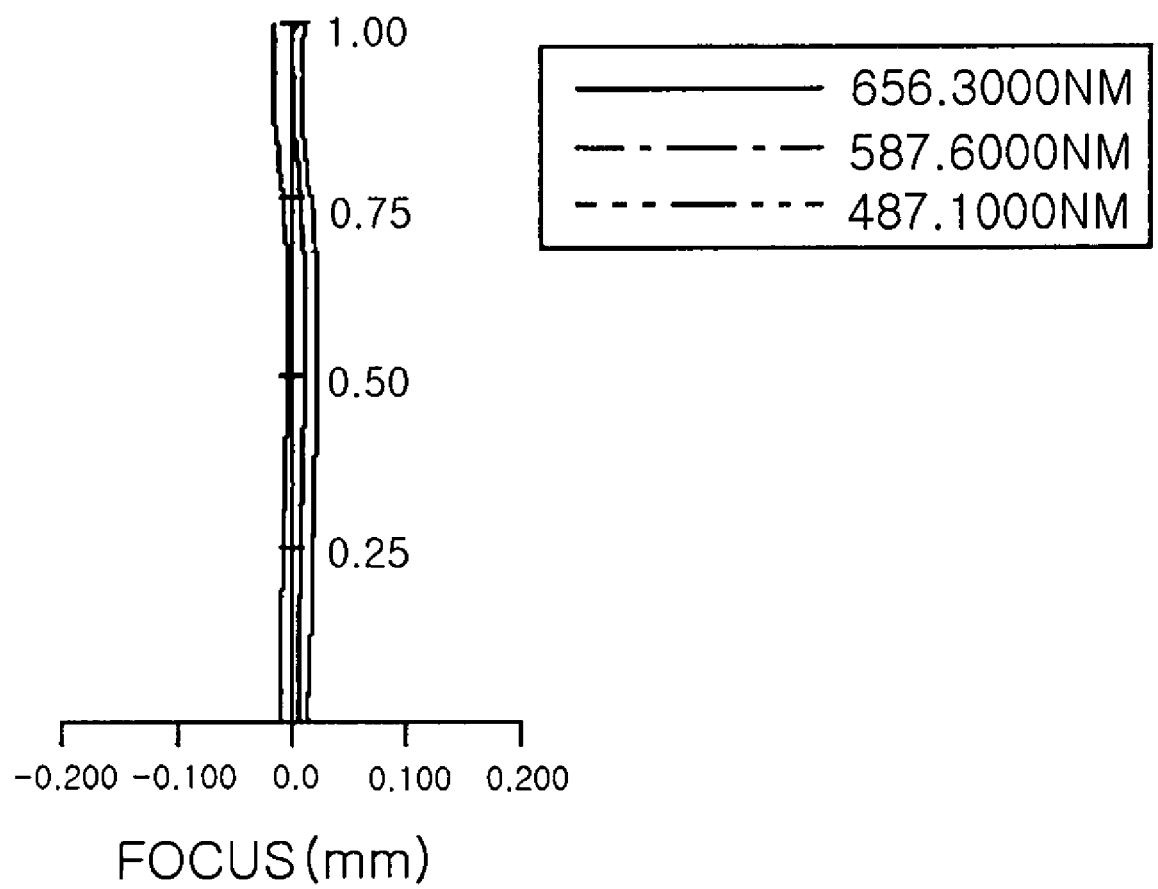
FIG. 2A is a diagram illustrating a spherical aberration of the optical system of FIG. 1.
Figure 2B:
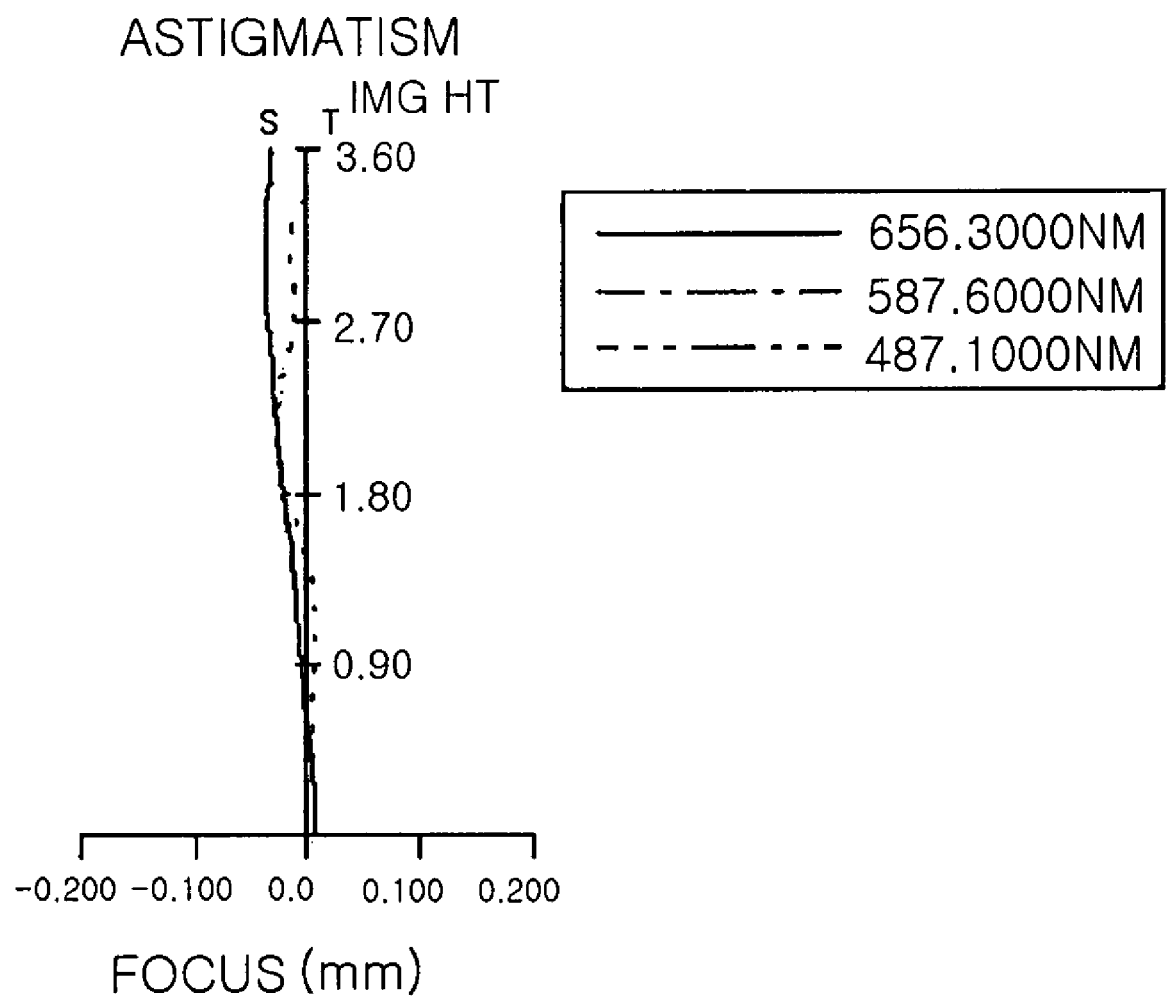
FIG. 2B is a diagram illustrating an astigmatism of the optical system of FIG. 1.
Figure 2C:
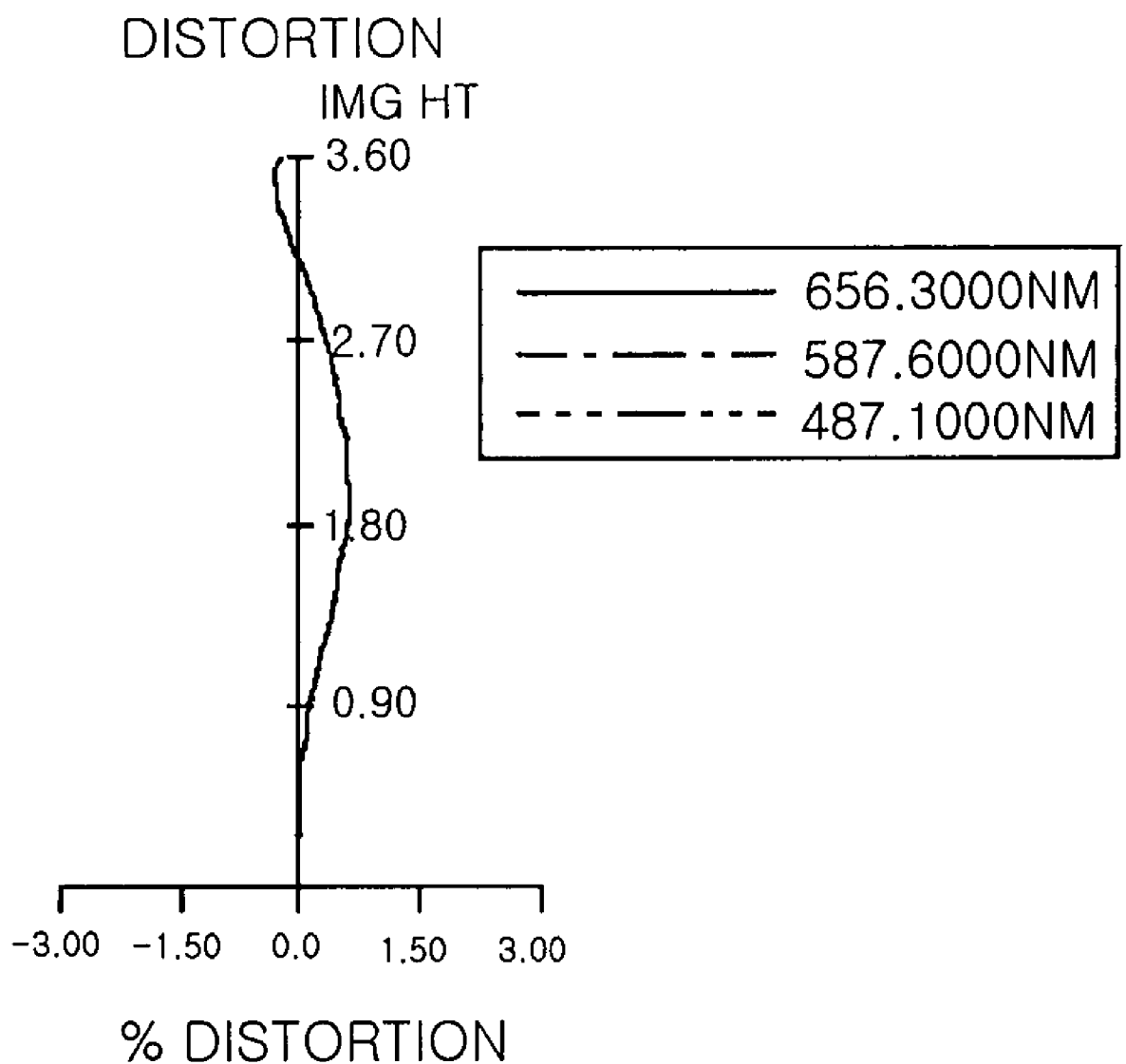
FIG. 2C is a diagram illustrating a distortion of the optical system of FIG. 1.
Figure 3:
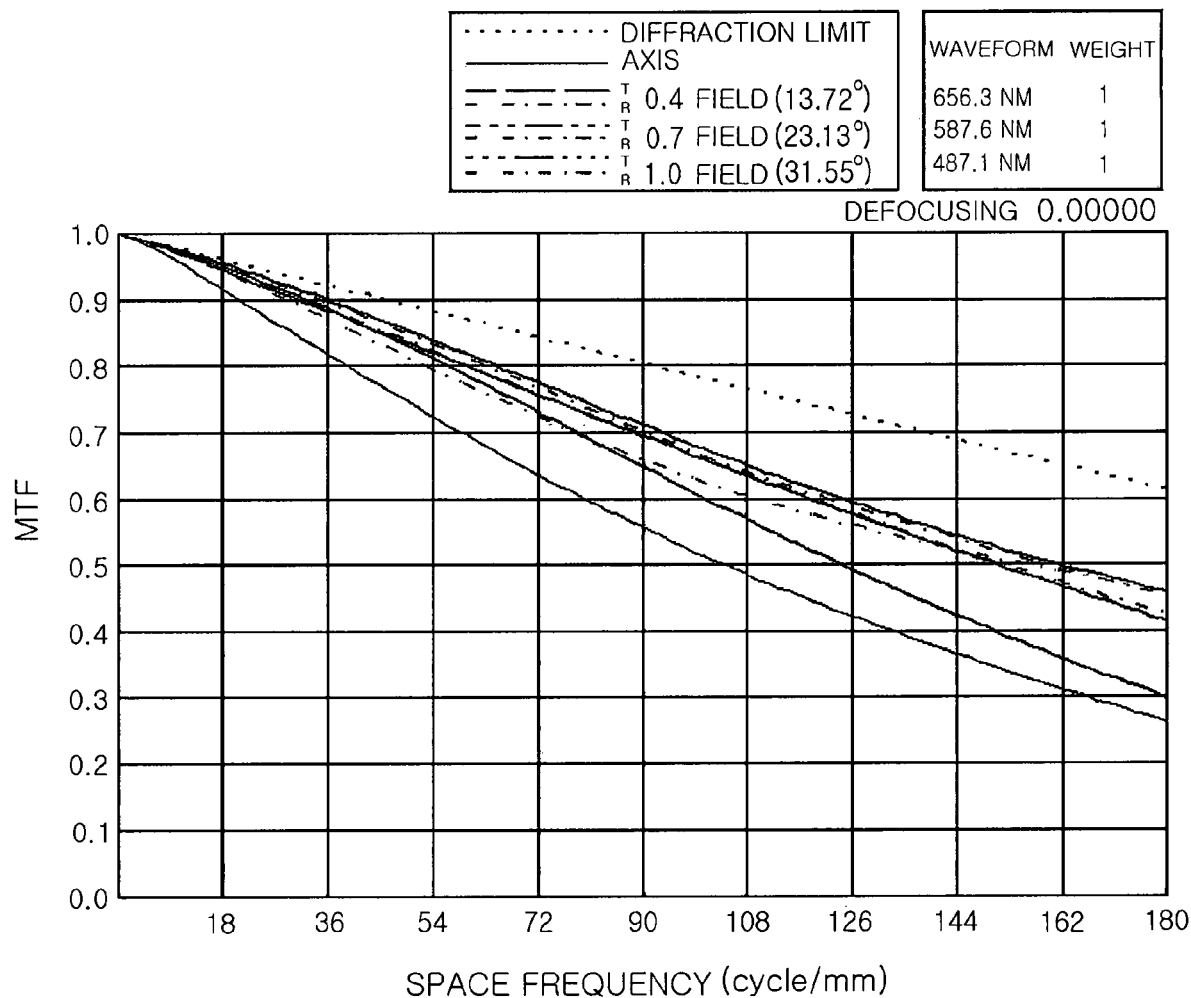
FIG. 3 is a modulation transfer function (MTF) chart illustrating the optical system of FIG. 1.

Table 1 indicates numerical values of a subminiature optical system according to a first embodiment of the present invention. Also, FIG. 1 is a configuration diagram illustrating lenses of the subminiature optical system according to the first embodiment, FIGS. 2A through 2C illustrate various aberrations of the optical system of Table 1 and FIG. 1, and FIG. 3 is a modulation transfer function (MTF) chart illustrating the optical system of Table 1 and FIG. 1.

Hereinafter, in each embodiment, "S" and "T" in FIG. 2B indicate sagitatal and tangential, respectively.

Also, MTF depends on a space-frequency of a cycle per millimeter and is a value defined Equation 2 between a maximum strength Max and a minimum strength Min of a light.

$$MTF = \frac{Max - Min}{Max + Min} \qquad \text{Equation 2}$$

This is, it is most ideal when MTF is 1, and resolution decreases when an MTF value decreases.

In the case of Embodiment 1, an F number is 3.0, a viewing angle is 63 degrees, a length TL from the object-side surface to the image-side surface 12 is 7.40 mm, and an effective focal length f of the optical system is 5.88 mm. Also, in this case, the first lens L1, the third lens L3, and the fourth lens L4 are formed of plastic material.

TABLE 1

| Surface No. | Radius of Curvature (R) | Thickness/ Length (t) | Refraction Index ($N_d$) | Abbe Number ($V_d$) | Reference |
|---|---|---|---|---|---|
| *1 | 3.1554 | 0.77 | 1.53 | 56.4 | Lens 1 |
| *2 | −6.2706 | 0.1 | | | |
| 3 | ∞ | 0.1438 | | | Aperture Stop |
| 4 | 11.0380 | 0.45 | 1.81 | 24.0 | Lens 2 |
| 5 | 3.4993 | 1.3625 | | | |
| *6 | −1.5676 | 0.81 | 1.53 | 56.4 | Lens 3 |
| *7 | −1.3328 | 0.1 | | | |
| *8 | 2.3239 | 0.83 | 1.53 | 56.4 | Lens 4 |
| *9 | 1.6154 | 0.8921 | | | |
| 10 | ∞ | 0.3 | 1.52 | 64.1 | Optical Filter |
| 11 | ∞ | 1.6416 | | | |
| 12 | ∞ | 0 | | | Image-side Surface |

TABLE 1-continued

| Surface No. | Radius of Curvature (R) | Thickness/ Length (t) | Refraction Index ($N_d$) | Abbe Number ($V_d$) | Reference |
|---|---|---|---|---|---| where * indicates an aspherical surface, and refractive surfaces 1 and 2 of the object side and image side of the first lens L1, refractive surfaces 6 and 7 of object side and image side of the third lens L3, and refractive surfaces 8 and 9 of object side and image side of the fourth lens L4 are formed of aspherical surfaces, respectively, in Embodiment 1.

Values of aspherical coefficients of Embodiment 1 according to Equation 1 are shown in Table 2.

TABLE 2

| Surface No. | K | A | B | C | D |
|---|---|---|---|---|---|
| 1 | −1.4772 | −0.0082 | −0.0091 | 0.0015 | −0.0032 |
| 2 | 3.7828 | −0.0084 | −0.0107 | 0.0004 | −0.0011 |
| 6 | −4.117 | −0.0689 | −0.0211 | 0.0132 | −0.0014 |
| 7 | −0.8302 | 0.019 | −0.0154 | 0.0018 | 0.0008 |
| 8 | −7.1604 | −0.0218 | 0.0051 | −0.0006 | 0.00002 |
| 9 | −5.886 | −0.0215 | 0.0026 | −0.0002 | 0.000003 |

Embodiment 2

Figure 4:
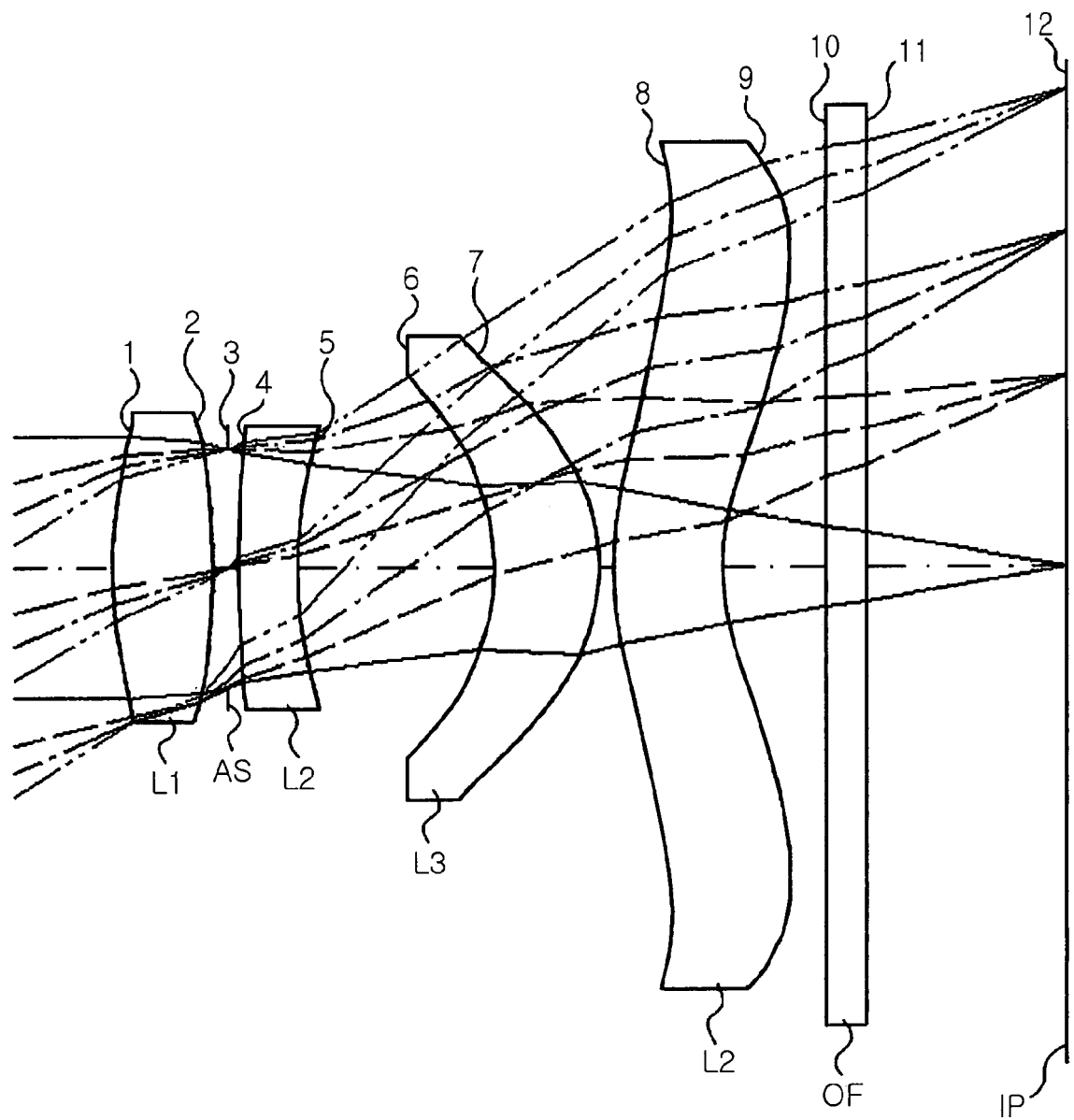
FIG. 4 is a configuration diagram illustrating lenses of a subminiature optical system according to a second embodiment of the present invention.
Figure 5A:
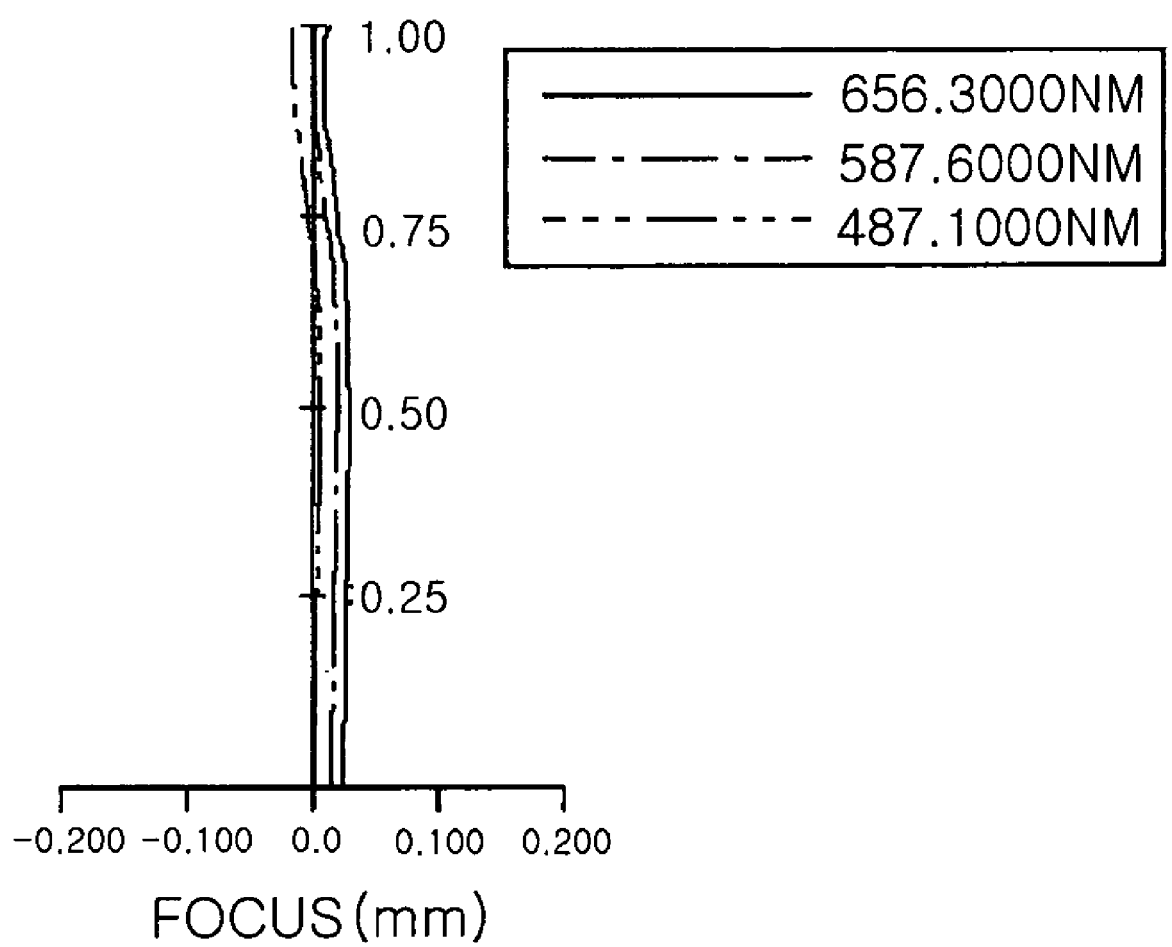
FIG. 5A is a diagram illustrating a spherical aberration of the optical system of FIG. 4.
Figure 5B:
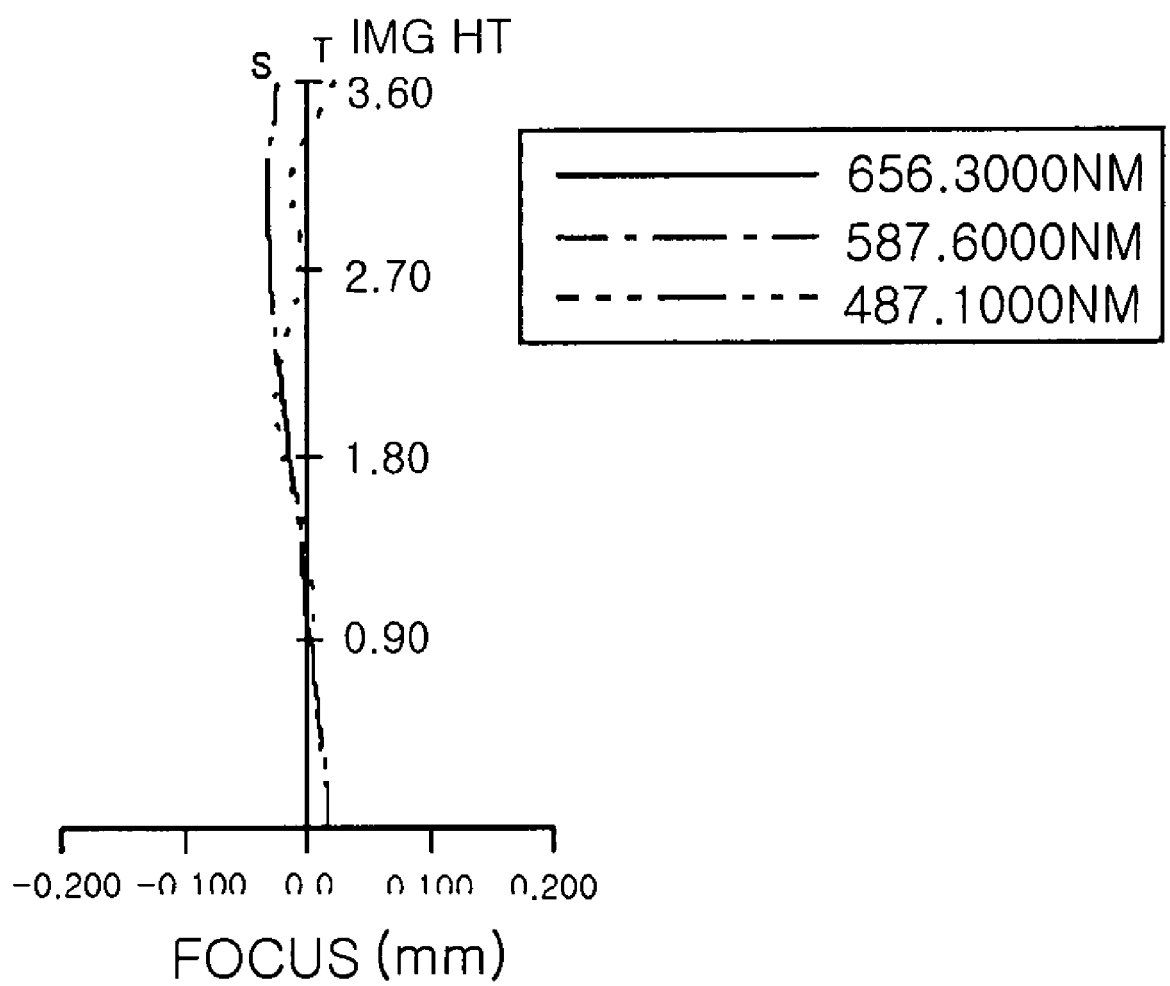
FIG. 5B is a diagram illustrating an astigmatism of the optical system of FIG. 4.
Figure 5C:
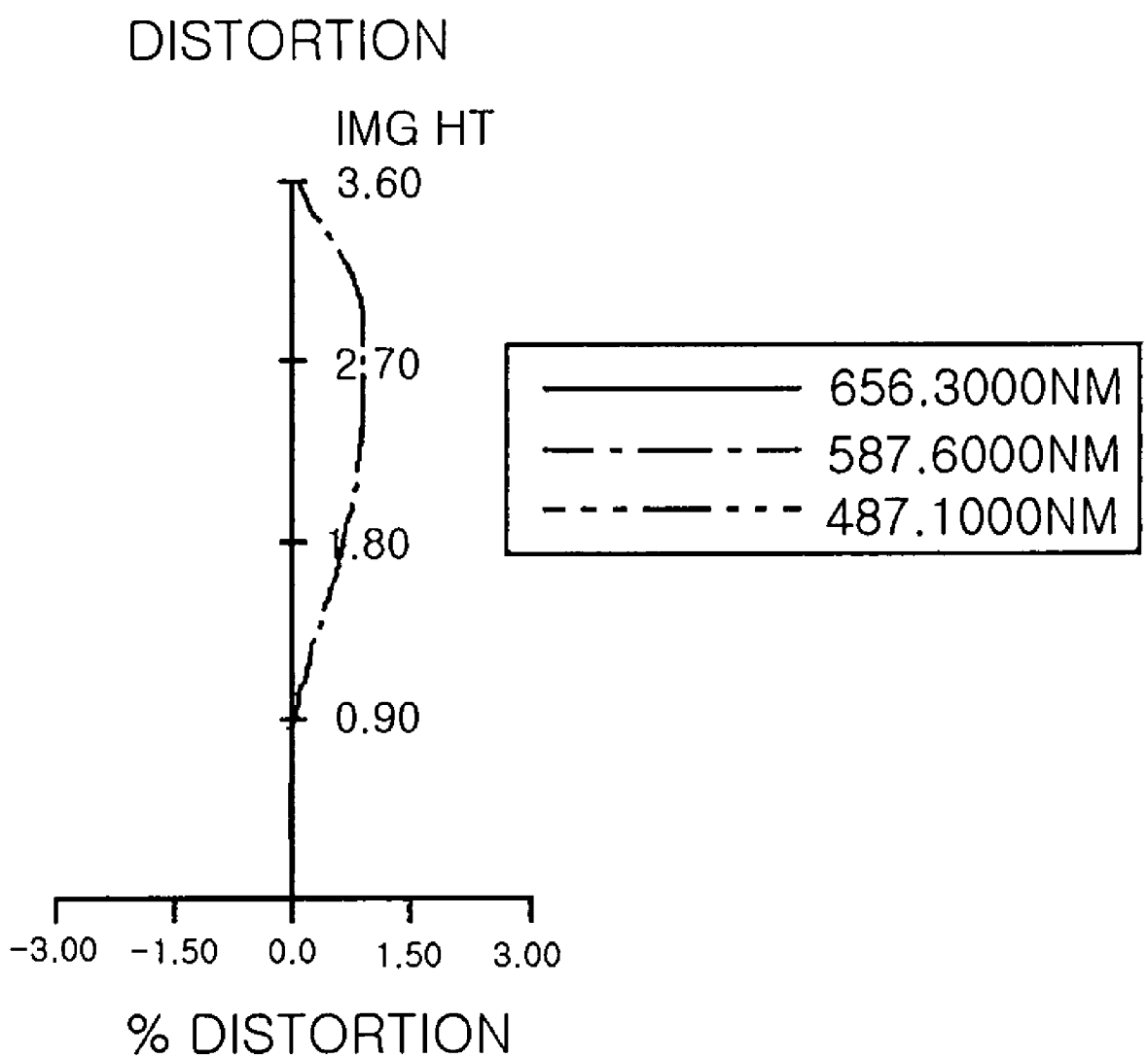
FIG. 5C is a diagram illustrating a distortion of the optical system of FIG. 4.
Figure 6:
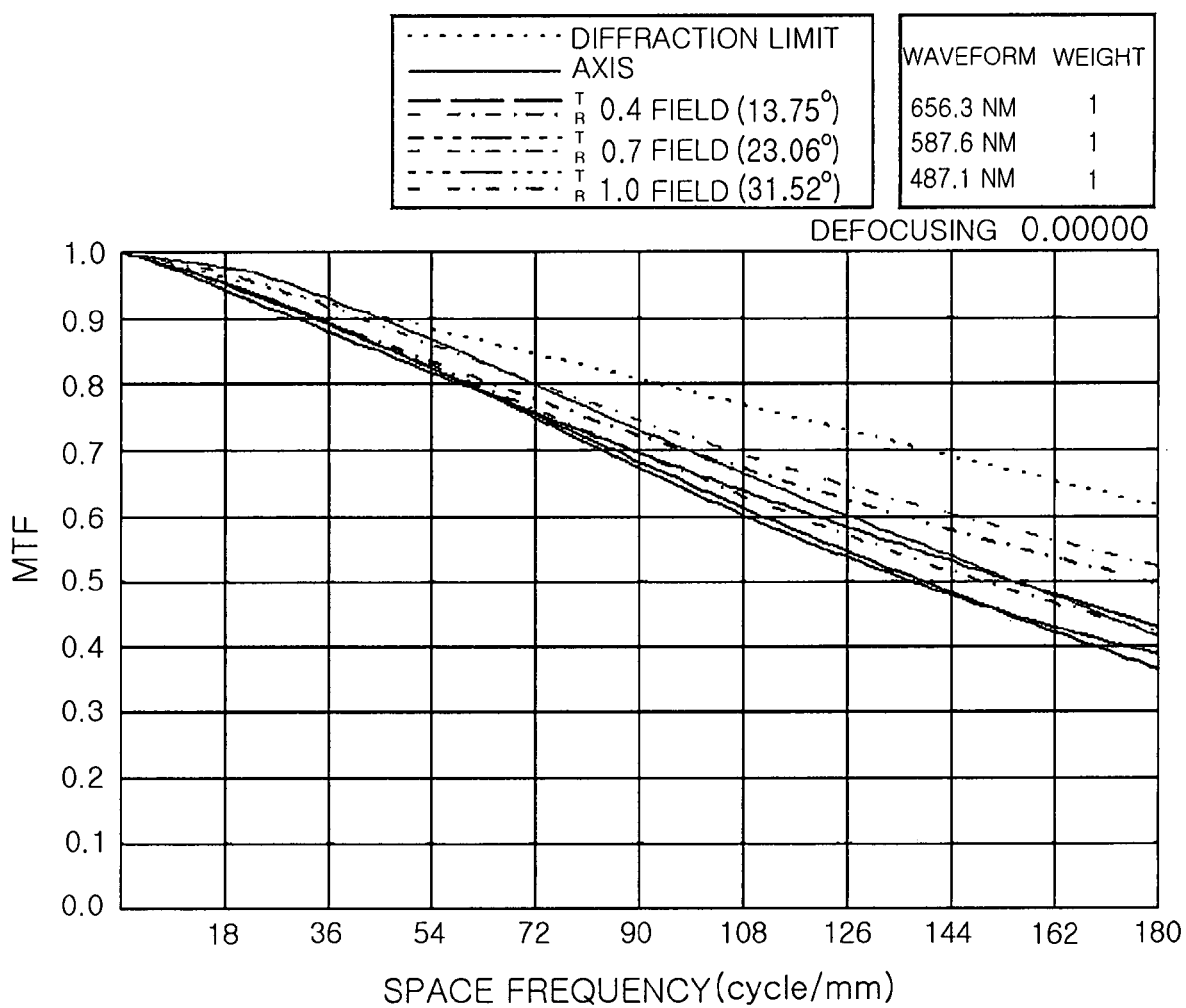
FIG. 6 is an MTF chart illustrating the optical system of FIG. 4.

Table 3 shows examples of numerical values of a subminiature optical system according to a second embodiment of the present invention. Also, FIG. 4 is a configuration diagram illustrating lenses of the subminiature optical system according to the second embodiment of the present invention. FIGS. 5A through 5C are diagrams illustrating various aberrations of the optical system shown in Table 3 and FIG. 4, respectively. FIG. 6 is an MTF graph illustrating the optical systems shown in Table 3 and FIG. 4.

In the case of Embodiment 2, the F number is 3.0, the viewing angle is 63 degrees, the length TL from the object-side surface 1 to the image-side surface 12 of the first lens L1 is 7.313 mm, and the effective focal length f of the optical system is 5.88 mm. Also, in the case of Embodiment 2, the first lens L1, the third lens L3, and the fourth lens L4 are formed of plastic material.

TABLE 3

| Surface No. | Radius of Curvature (R) | Thickness/ Length (t) | Refraction Index ($N_d$) | Abbe Number ($V_d$) | Reference |
|---|---|---|---|---|---|
| *1 | 3.1548 | 0.77 | 1.53 | 56.4 | Lens 1 |
| *2 | −6.3630 | 0.1 | | | |
| 3 | ∞ | 0.1 | | | Aperture Stop |
| 4 | 11.1874 | 0.45 | 1.81 | 24.0 | Lens 2 |
| 5 | 3.6204 | 1.5011 | | | |
| *6 | −1.7322 | 0.81 | 1.53 | 56.4 | Lens 3 |
| *7 | −1.3606 | 0.1 | | | |
| *8 | 2.2517 | 0.83 | 1.53 | 56.4 | Lens 4 |
| *9 | 1.4209 | 0.8011 | | | |
| 10 | ∞ | 0.3 | 1.52 | 64.1 | Optical Filter |
| 11 | ∞ | 1.5506 | | | |
| 12 | ∞ | 0 | | | Image-side Surface | where * indicates an aspherical surface, and refractive surfaces 1 and 2 of the object side and image side of the first lens L1, refractive surfaces 6 and 7 of object side and image side of the third lens L3, and refractive surfaces 8 and 9 of object side and image side of the fourth lens L4 are formed of aspherical surfaces, respectively, in Embodiment 2.

Values of aspherical coefficients of Embodiment 2 according to Equation 1 are shown in Table 4.

TABLE 4

| Surface No. | K | A | B | C | D |
|---|---|---|---|---|---|
| 1 | −1.5095 | −0.0081 | −0.0084 | 0.0011 | −0.0029 |
| 2 | 3.8015 | −0.0084 | −0.0098 | −0.0002 | −0.0009 |
| 6 | −4.8001 | −0.053 | −0.0189 | 0.0101 | −0.001 |
| 7 | −0.8927 | 0.0265 | −0.0178 | 0.0029 | 0.0004 |
| 8 | −7.2379 | −0.022 | 0.0052 | −0.0006 | 0.00002 |
| 9 | −5.1864 | −0.02 | 0.0027 | −0.0002 | 0.000005 |

Embodiment 3

Figure 7:
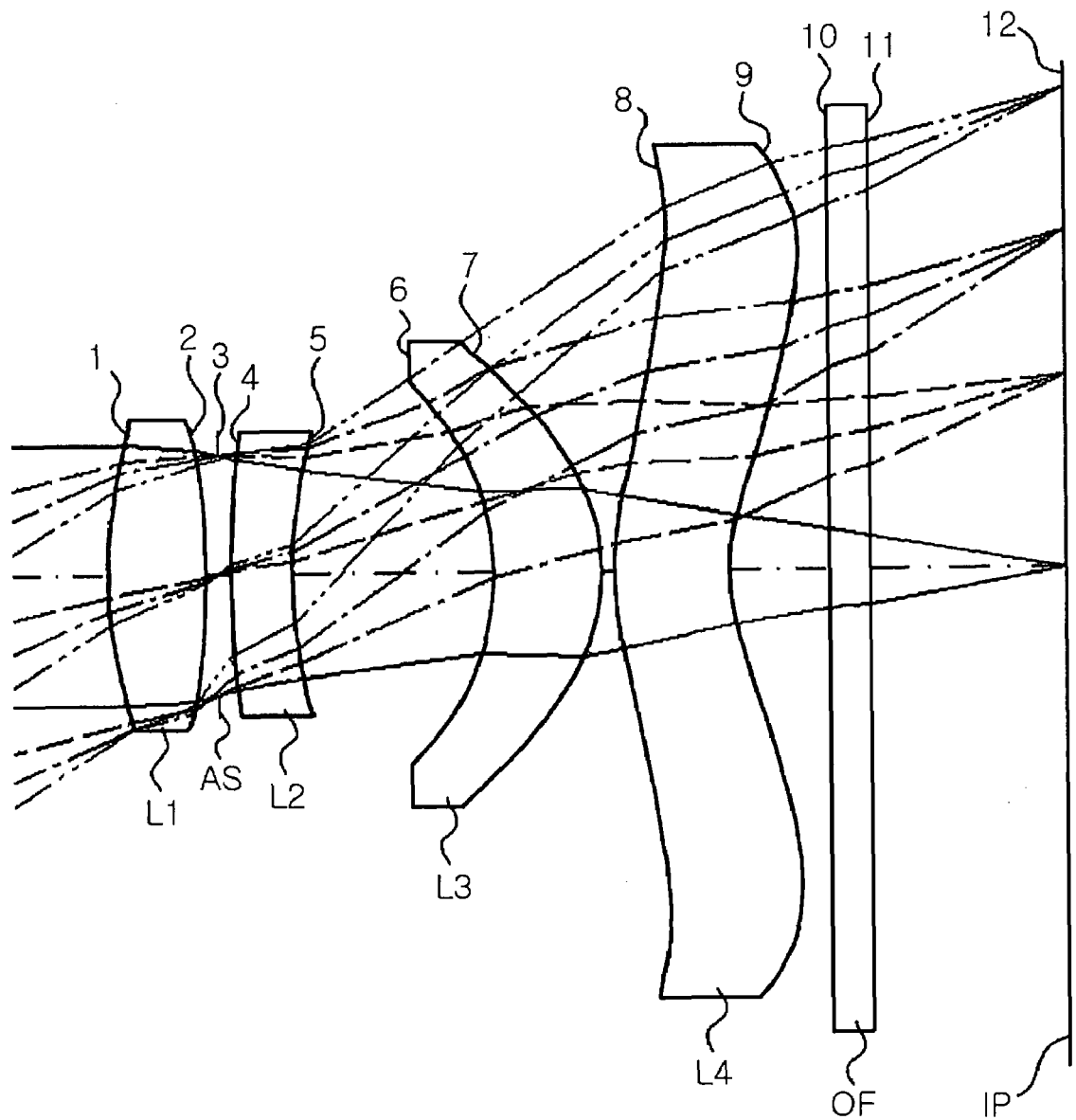
FIG. 7 is a configuration diagram illustrating lenses of a subminiature optical system according to a third embodiment of the present invention.
Figure 8A:
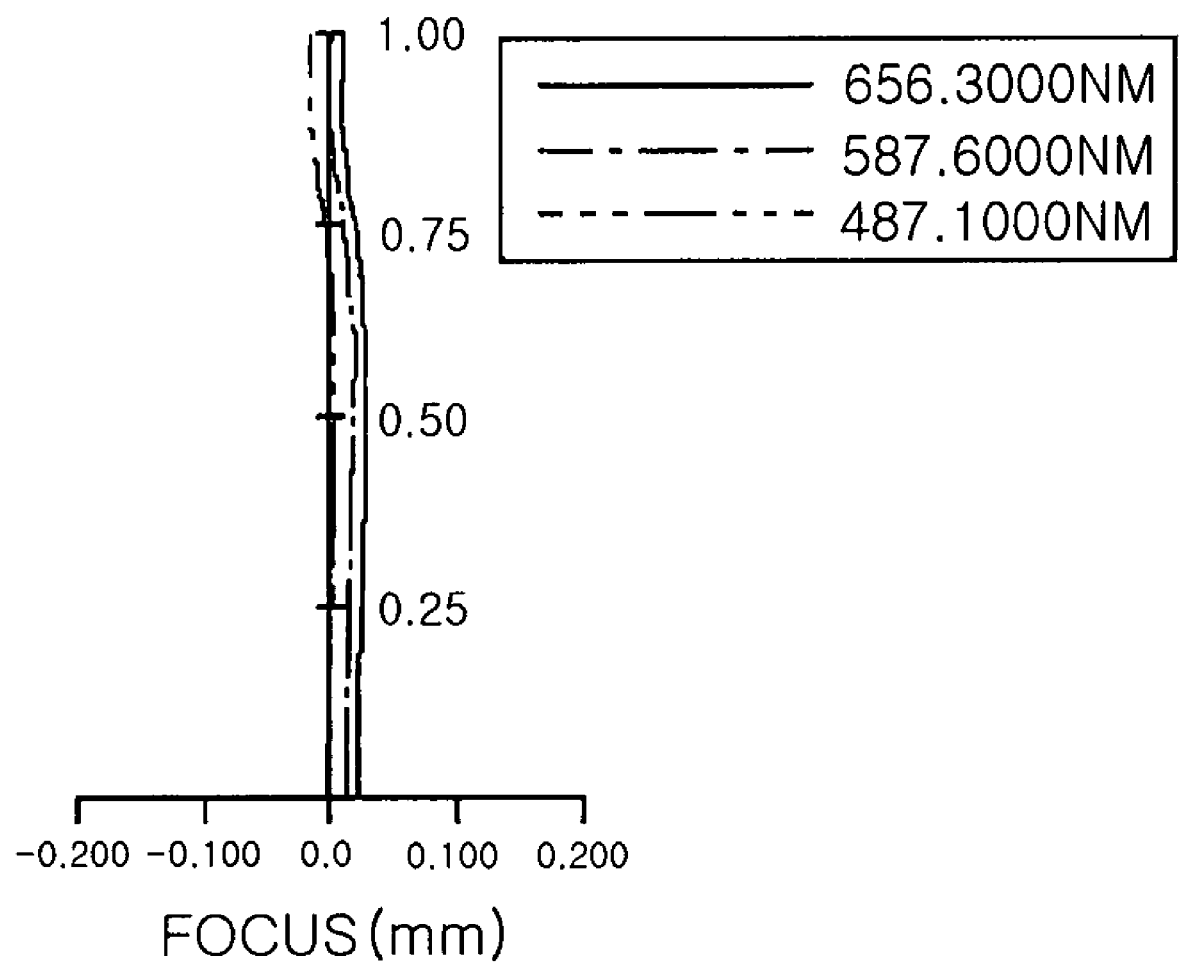
FIG. 8A is a diagram illustrating a spherical aberration of the optical system of FIG. 7.
Figure 8B:
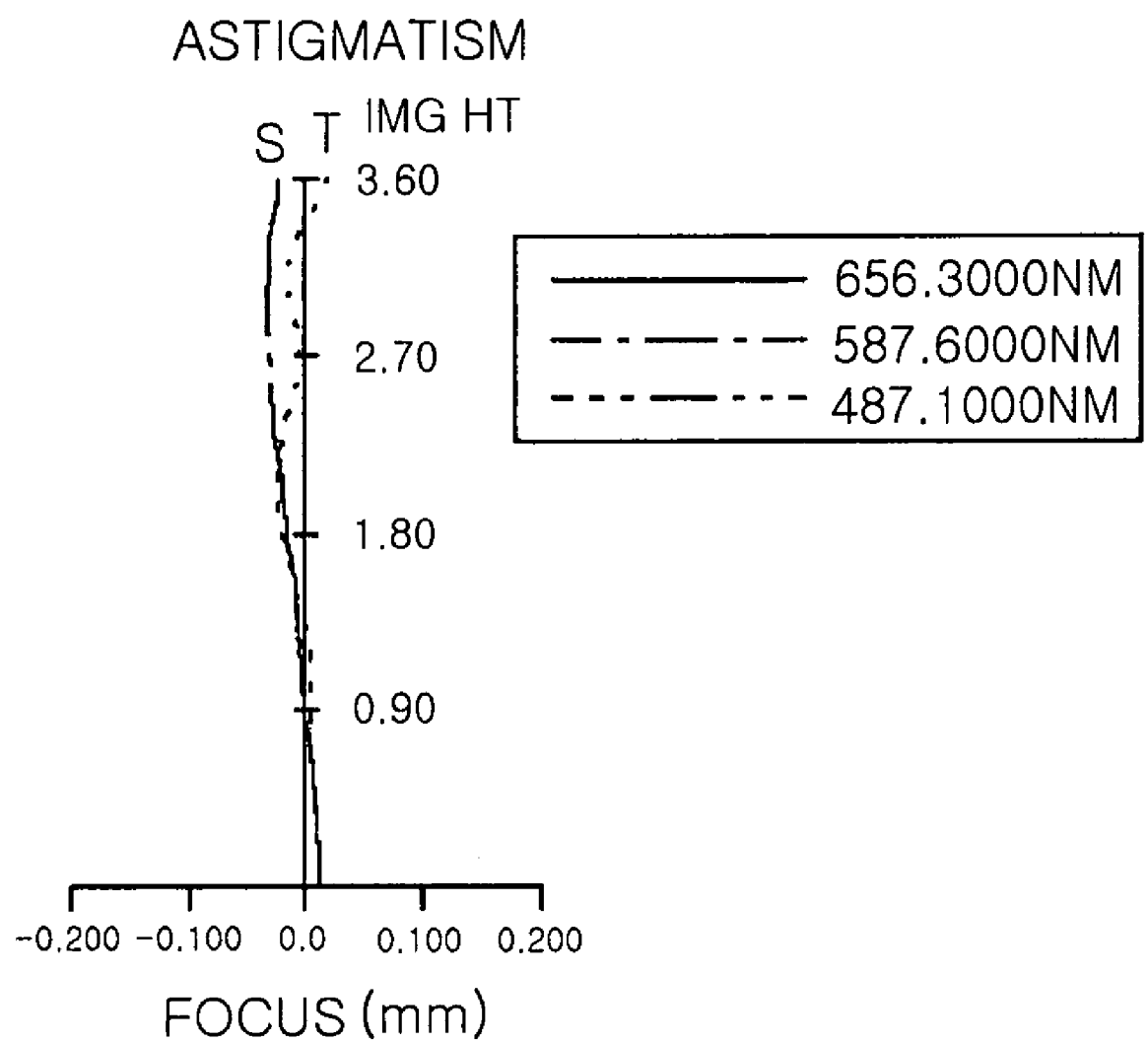
FIG. 8B is a diagram illustrating an astigmatism of the optical system of FIG. 7.
Figure 8C:
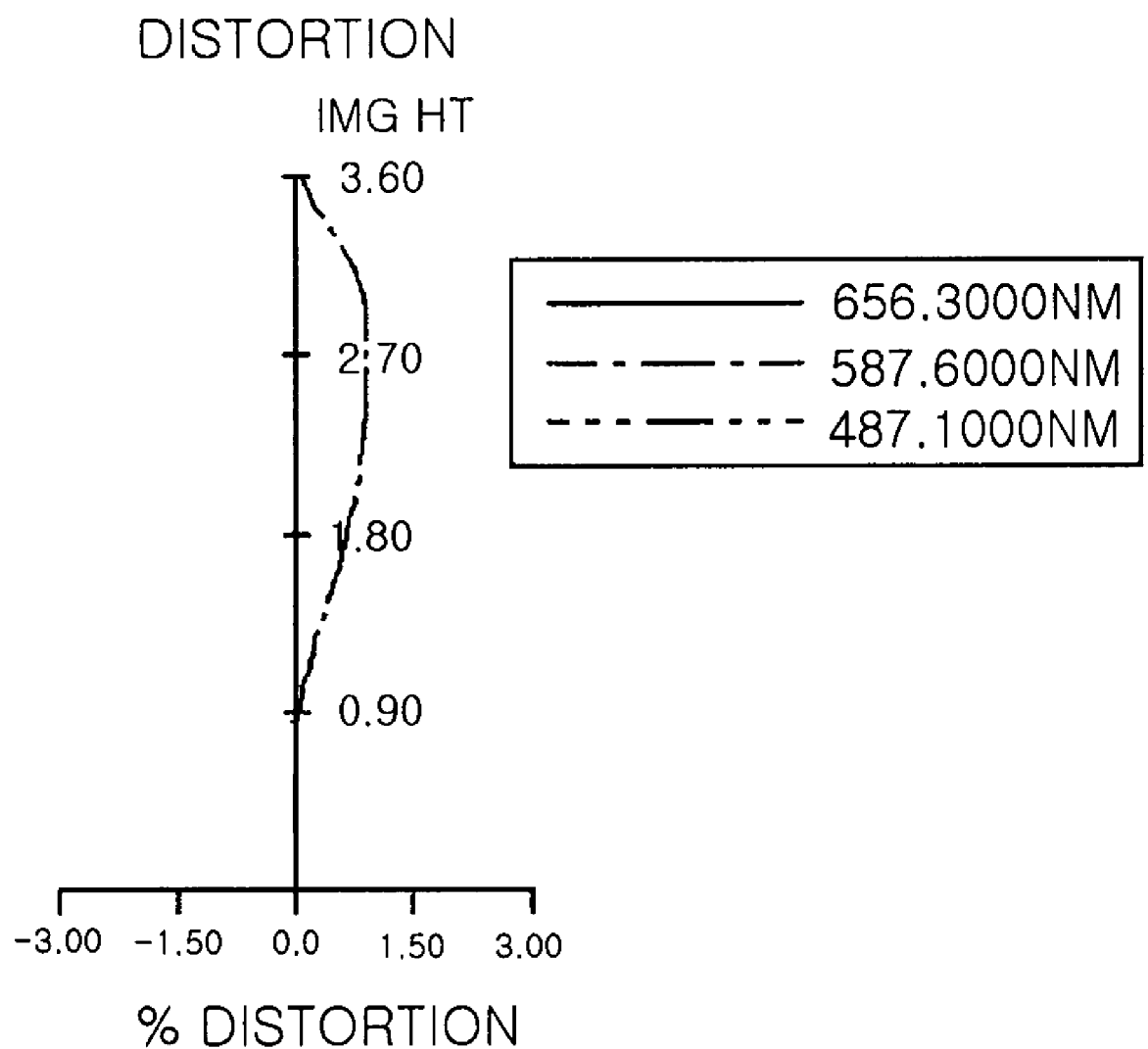
FIG. 8C is a diagram illustrating a distortion of the optical system of FIG. 7.
Figure 9:
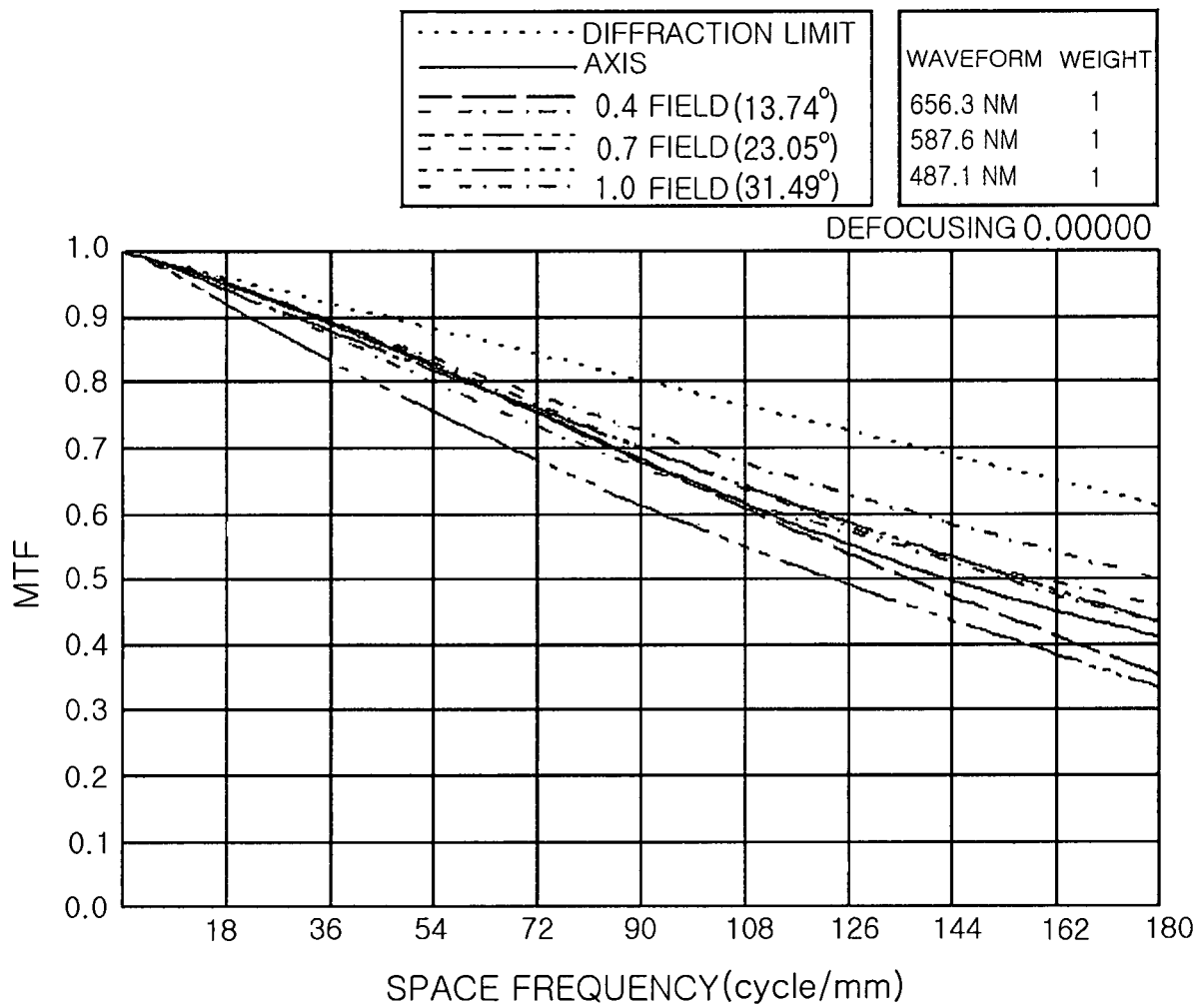
FIG. 9 is an MTF chart illustrating the optical system of FIG. 7.

Table 5 shows examples of numerical values of a subminiature optical system according to a third embodiment of the present invention. Also, FIG. 7 is a configuration diagram illustrating lenses of the subminiature optical system according to the third embodiment of the present invention. FIGS. 8A through 8C are diagrams illustrating various aberrations of the optical system shown in Table 5 and FIG. 7, respectively. FIG. 9 is an MTF graph illustrating the optical system shown in Table 5 and FIG. 7.

In the case of Embodiment 3, the F number is 3.0, the viewing angle is 63 degrees, the length TL from the object-side surface 1 to the image-side surface 12 of the first lens L1 is 7.324 mm, and the effective focal length f of the optical system is 5.88 mm. Also, in the case of Embodiment 3, the first lens L1, the third lens L3, and the fourth lens L4 are formed of plastic material.

TABLE 5

| Surface No. | Radius of Curvature (R) | Thickness/ Length (t) | Refraction Index ($N_d$) | Abbe Number ($V_d$) | Reference |
|---|---|---|---|---|---|
| *1 | 3.1650 | 0.7416 | 1.53 | 56.4 | Lens 1 |
| *2 | −6.4782 | 0.1 | | | |
| 3 | ∞ | 0.1 | | | Aperture Stop |
| 4 | 10.9649 | 0.45 | 1.81 | 24.0 | Lens 2 |
| 5 | 3.6316 | 1.5507 | | | |
| *6 | −1.8198 | 0.8272 | 1.53 | 56.4 | Lens 3 |
| *7 | −1.3724 | 0.1 | | | |
| *8 | 2.4096 | 0.872 | 1.53 | 56.4 | Lens 4 |
| *9 | 1.4373 | 0.7663 | | | |
| 10 | ∞ | 0.3 | 1.52 | 64.1 | Optical Filter |
| 11 | ∞ | 1.5158 | | | |
| 12 | ∞ | 0 | | | Image-side Surface | where * indicates an aspherical surface, and refractive surfaces 1 and 2 of the object side and image side of the first lens L1, refractive surfaces 6 and 7 of object side and image side of the third lens L3, and refractive surfaces 8 and 9 of object side and image side of the fourth lens L4 are formed of aspherical surfaces, respectively, in Embodiment 3.

Values of aspherical coefficients of Embodiment 3 according to Equation 1 are shown in Table 6.

TABLE 6

| Surface No. | K | A | B | C | D |
|---|---|---|---|---|---|
| 1 | −1.57 | −0.0083 | −0.0085 | 0.0009 | −0.0031 |
| 2 | 4.0744 | −0.0085 | −0.0099 | −0.0005 | −0.0009 |
| 6 | −4.9095 | −0.0492 | −0.0187 | 0.0097 | −0.001 |
| 7 | −0.895 | 0.0265 | −0.0174 | 0.0029 | 0.0003 |

TABLE 6-continued

| Surface No. | K | A | B | C | D |
|---|---|---|---|---|---|
| 8 | −7.8844 | −0.0219 | 0.0052 | −0.0006 | 0.00002 |
| 9 | −5.1917 | −0.0196 | 0.0027 | −0.0002 | 0.000005 |

As shown in FIGS. 2, 5, and 7, via Embodiments 1 to 3 described above, it may be known that characteristics of various aberrations may be obtained.

On the other hand, values of Conditions 1 to 7 with respect to Embodiments 1 to 3 are shown in Table 7.

TABLE 7

|  | Embodiment 1 | Embodiment 2 | Embodiment 3 |
|---|---|---|---|
| Condition 1 | 1.259 | 1.244 | 1.246 |
| Condition 2 | 0.693 | 0.696 | 0.701 |
| Condition 3 | 1.058 | 1.105 | 1.122 |
| Condition 4 | 1.877 | 1.903 | 1.865 |
| Condition 5 | 1.301 | 1.160 | 1.092 |
| Condition 6 | 2.861 | 1.900 | 1.658 |
| Condition 7 | 32.4 | 32.4 | 32.4 |

As shown in Table 7, it may be known that Embodiments 1 to 3 satisfy Conditions 1 to 7.

As described above, according to an exemplary embodiment of the present invention, there is provided a subminiature optical system suitable for a subminiature optical device such as a camera for a mobile phone using an image sensor such as CCD and CMOS, the optical system having an F number of about 3.0 and a wide viewing angle of 62 degrees or more.

Also, a chromatic aberration is reduced by using a first lens and a second lens, largely different in Abbe number, and refractive powers of the first lens and the second lens are relatively increased, thereby manufacturing a subminiature optical system.

Tolerance sensitivity of lenses is eased by disposing an aperture stop in the back of a first lens with a greatest refractive power, and an excellent effect of distortion correction may be obtained.

Also, various aberrations are reduced and an image with high-resolution and high definition may be obtained by controlling a radius of curvature of each of refractive surfaces and using an aspherical surface.

Not only a weight of an optical system may be reduced but also mass production is easy at a low price by using a plurality of plastic lenses.

While the present invention has been shown and described in connection with the exemplary embodiments, it will be apparent to those skilled in the art that modifications and variations can be made without departing from the spirit and scope of the invention as defined by the appended claims.

What is claimed is:

1. A subminiature optical system comprising:
   a first lens that is a biconvex lens with a positive refractive power;
   a second lens with a negative refractive power, the second lens formed in a meniscus shape convex toward an object side;
   a third lens with a positive refractive power, the third lens formed in a meniscus shape convex toward an image side; and
   a fourth lens with a negative refractive power,
   wherein a size in a direction of an optical axis satisfies Condition 1, and the refractive power of the first lens satisfies Condition 2, $1.2 < TL/f < 1.3$  Condition 1, and $0.6 < f1/f < 0.8$  Condition 2 where TL indicates a length from an aperture stop to an image-side surface, f indicates an effective focal length of the overall optical system, and f1 indicates a focal length of the first lens.

2. The optical system of claim 1, wherein the refractive power of the second lens satisfies Condition 3 and the shape of the second lens satisfies Condition 4, $0.8 < |f2/f| < 1.4$  Condition 3, and $0.35 < R4/f < 2.0$  Condition 4 where f2 indicates a focal length of the second lens (f2<0), and R4 indicates a curvature radius of an object-side surface of the second lens.

3. The optical system of claim 1, wherein the refractive power of the third lens satisfies Condition 5, $0.8 < f3/f < 1.6$  Condition 5 where f3 indicates a focal length of the third lens.

4. The optical system of claim 2, wherein the refractive power of the third lens satisfies Condition 5, $0.8 < f3/f < 1.6$  Condition 5 where f3 indicates a focal length of the third lens.

5. The optical system of claim 1, wherein the refractive power of the fourth lens satisfies Condition 6, $0.8 < |f4/f| < 4.0$  Condition 6 where f4 indicates a focal length of the fourth lens (f4<0).

6. The optical system of claim 2, wherein the refractive power of the fourth lens satisfies Condition 6, $0.8 < |f4/f| < 4.0$  Condition 6 where f4 indicates a focal length of the fourth lens (f4<0).

7. The optical system of claim 1, wherein Abbe numbers of the first lens and the second lens satisfy Condition 7, $25 < |V2 - V1|$  Condition 7 where V1 indicates the Abbe number of the first lens, and V2 indicates the Abbe number of the second lens.

8. The optical system of claim 2, wherein Abbe numbers of the first lens and the second lens satisfy Condition 7, $25 < |V2 - V1|$ where V1 indicates the Abbe number of the first lens, and V2 indicates the Abbe number of the second lens.

9. The optical system of claim 1, wherein the aperture stop is provided between the first lens and the second lens.

10. The optical system of claim 2, wherein the aperture stop is provided between the first lens and the second lens.

11. A subminiature optical system comprising:
    a first lens that is a biconvex lens with a positive refractive power;
    a second lens with a negative refractive power, the second lens formed in a meniscus shape convex toward an object side;
    a third lens with a positive refractive power, the third lens formed in a meniscus shape convex toward an image side; and
    a fourth lens with a negative refractive power, wherein the refractive power of the second lens satisfies Condition 3, and the shape of the second lens satisfies Condition 4, $$0.8 < |f2/f| < 1.4 \quad \text{Condition 3, and}$$

$$0.35 < R4/f < 2.0 \quad \text{Condition 4}$$

where f2 indicates a focal length of the second lens (f2<0), and R4 indicates a curvature radius of an object-side surface of the second lens.

12. The optical system of claim 11, wherein a size in a direction of an optical axis satisfies Condition 1, and the refractive power of the first lens satisfies Condition 2, $$1.2 < TL/f < 1.3 \quad \text{Condition 1, and}$$

$$0.6 < f1/f < 0.8 \quad \text{Condition 2}$$

where TL indicates a length from an aperture stop to an image-side surface, f indicates an effective focal length of the overall optical system, and f1 indicates a focal length of the first lens.

13. The optical system of claim 11, wherein the refractive power of the third lens satisfies Condition 5, and the refractive power of the fourth lens satisfies Condition 6, $$0.8 < f3/f < 1.6 \quad \text{Condition 5, and}$$

$$0.8 < |f4/f| < 4.0 \quad \text{Condition 6}$$

where f3 indicates a focal length of the third lens, and f4 indicates a focal length of the fourth lens (f4<0).

14. The optical system of claim 12, wherein the refractive power of the third lens satisfies Condition 5, and the refractive power of the fourth lens satisfies Condition 6, $$0.8 < f3/f < 1.6 \quad \text{Condition 5, and}$$

$$0.8 < |f4/f| < 4.0 \quad \text{Condition 6}$$

where f3 indicates a focal length of the third lens, and f4 indicates a focal length of the fourth lens (f4<0).

15. The optical system of claim 12, wherein the aperture stop is provided between the first lens and the second lens.

\* \* \* \* \*

UNITED STATES PATENT AND TRADEMARK OFFICE
CERTIFICATE OF CORRECTION

PATENT NO. : 7,561,347 B2  Page 1 of 1
APPLICATION NO. : 11/878423
DATED : July 14, 2009
INVENTOR(S) : Il Yong Park et al.

It is certified that error appears in the above-identified patent and that said Letters Patent is hereby corrected as shown below:

Title Page, Column 2 Item [57] (Abstract), Line 10, change "0.6<f1/f1<0.8" to --0.6<f1/f<0.8--.

Signed and Sealed this

Fifth Day of January, 2010

David J. Kappos
*Director of the United States Patent and Trademark Office*